Figure 1:
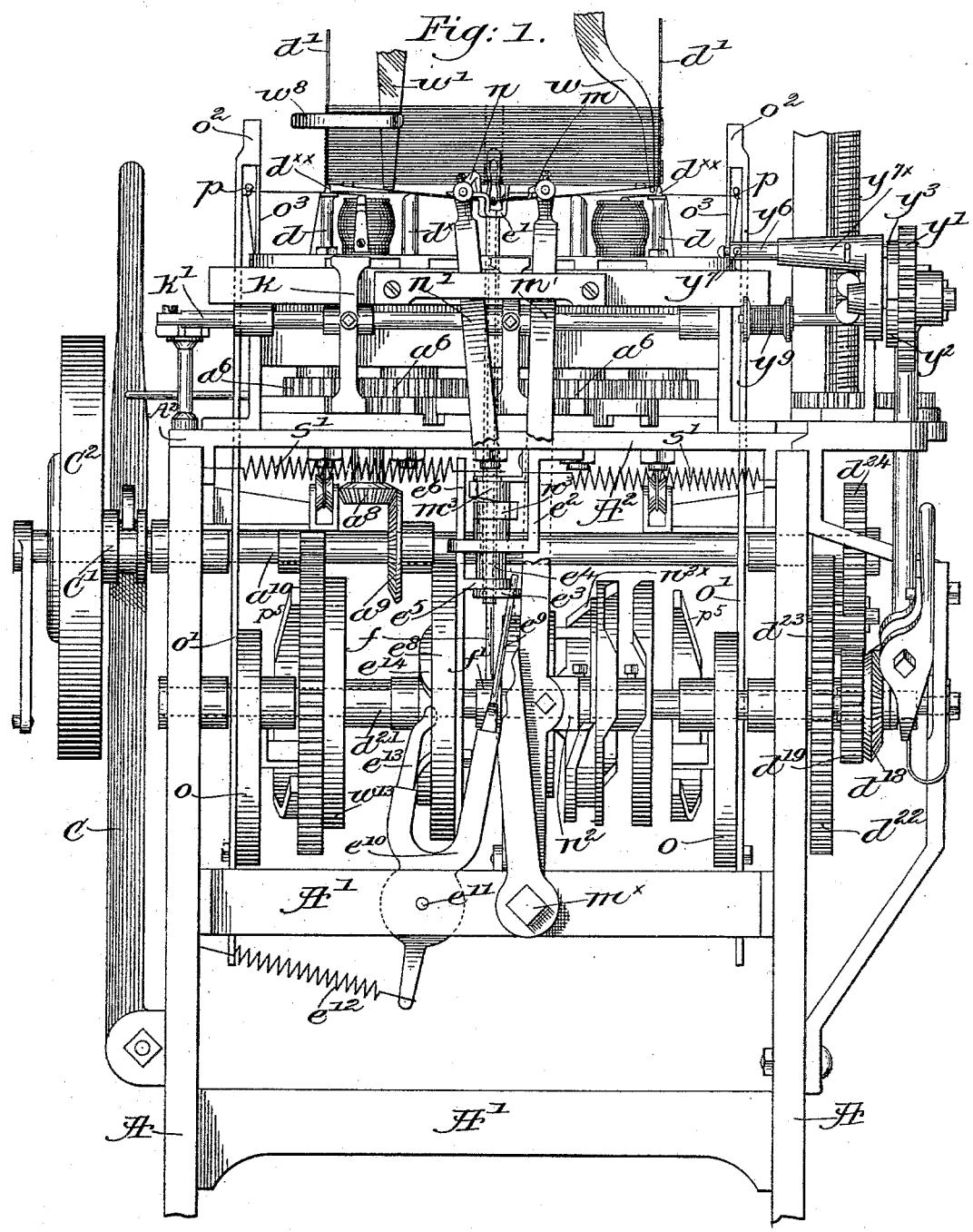

(No Model.)

G. W. & W. R. HARRIS.
MACHINE FOR MAKING LOOM HEDDLES.

No. 603,080. Patented Apr. 26, 1898.

Witnesses:
A. C. Harmon.
Thomas J. Drummond

Inventors
George W. Harris
William R. Harris.
by Crosby & Gregory Attys

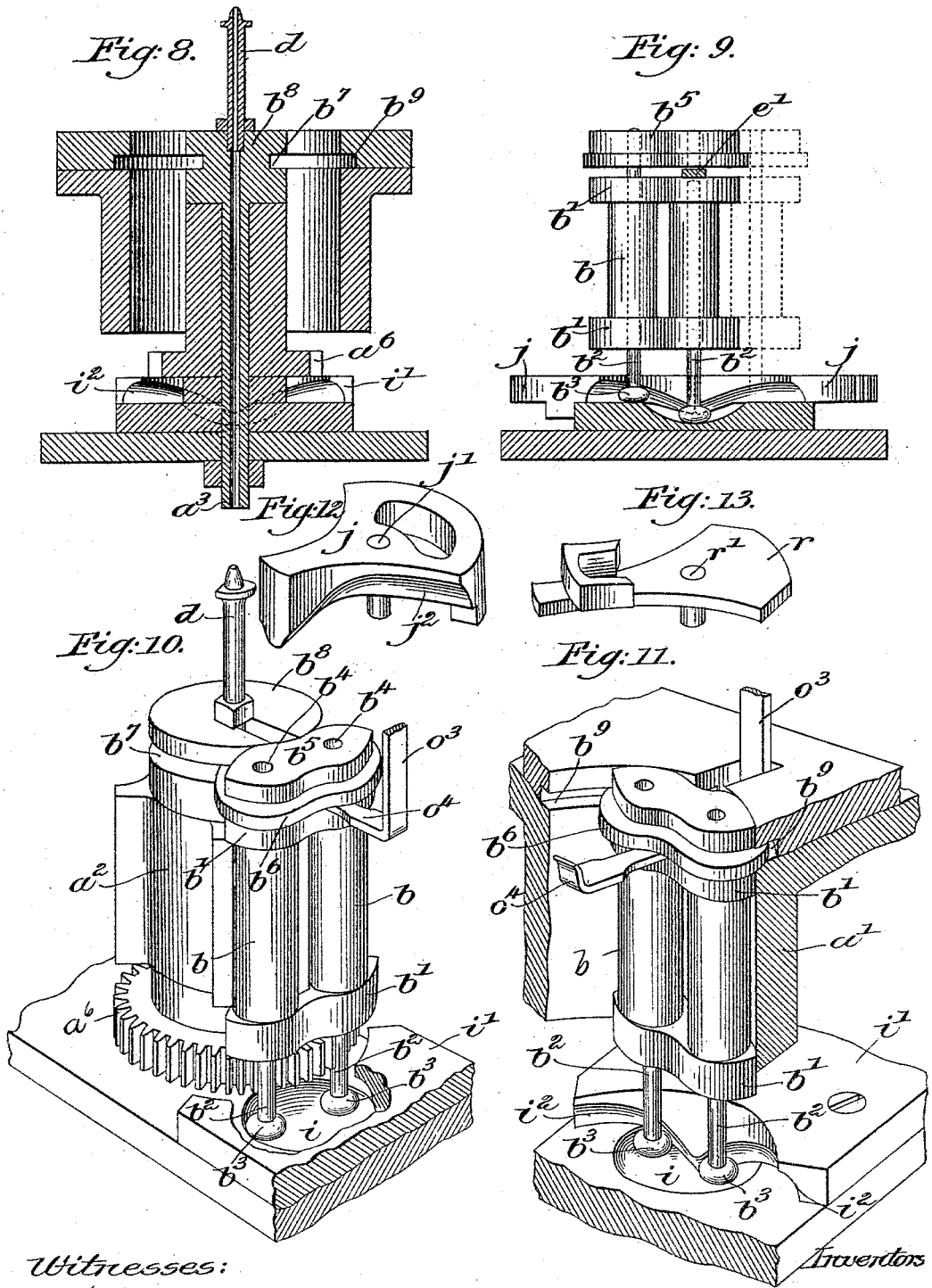

(No Model.) 10 Sheets—Sheet 7.
G. W. & W. R. HARRIS.
MACHINE FOR MAKING LOOM HEDDLES.
No. 603,080. Patented Apr. 26, 1898.
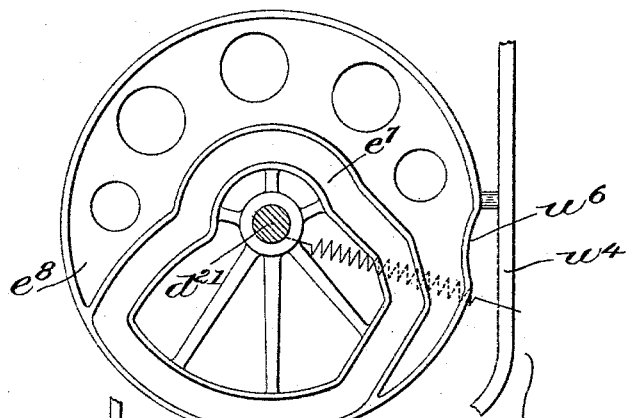
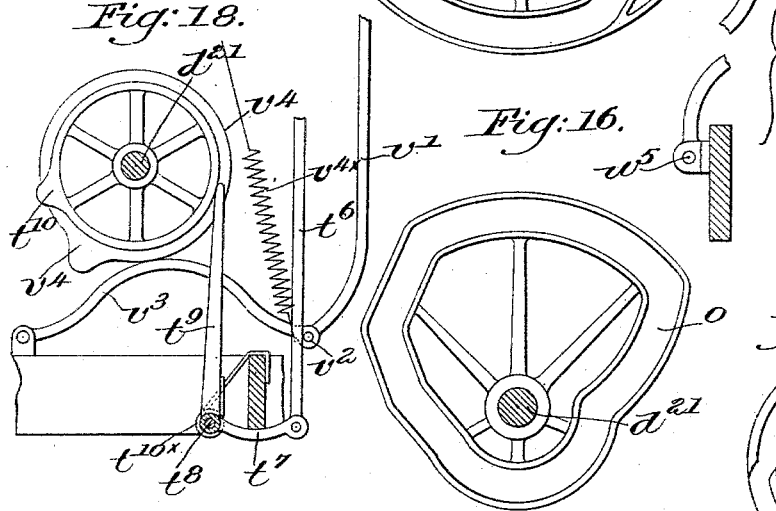
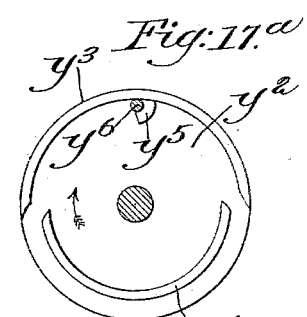
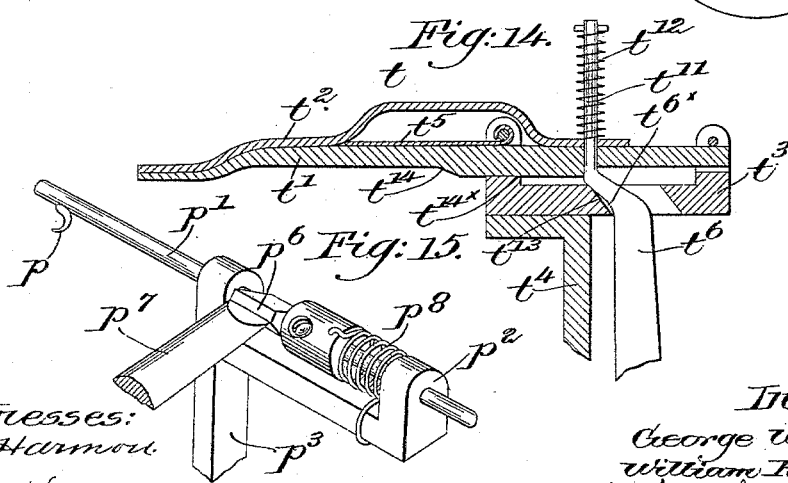
Witnesses:
A. C. Harmon
Thomas J. Drummond
Inventors
George W. Harris.
William R. Harris.
By Crosby Gregory. Attys (No Model.) 10 Sheets—Sheet 8.
G. W. & W. R. HARRIS.
MACHINE FOR MAKING LOOM HEDDLES.
No. 603,080. Patented Apr. 26, 1898.
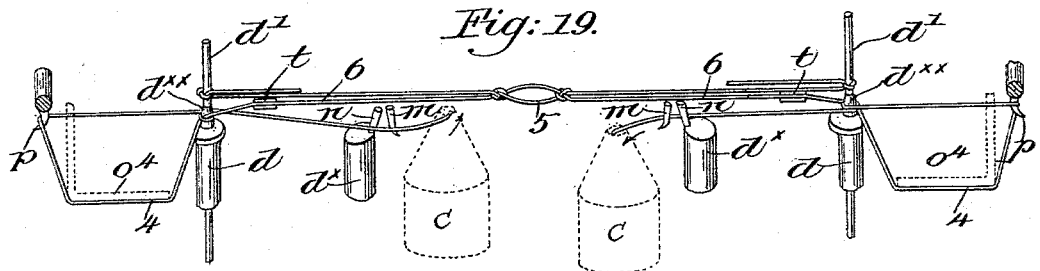
Fig: 19.
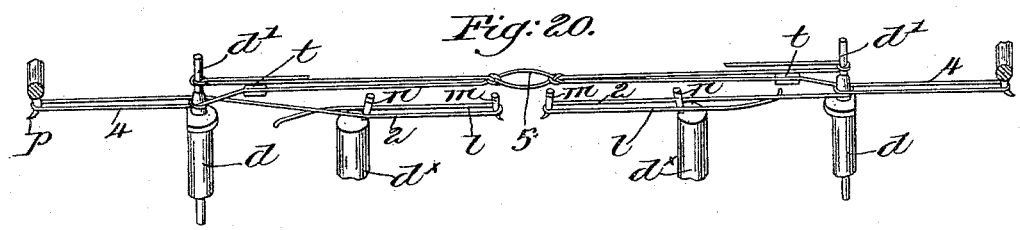
Fig: 20.
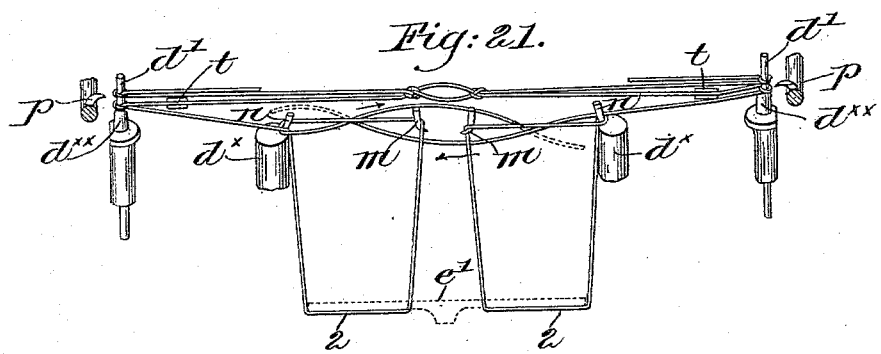
Fig: 21.
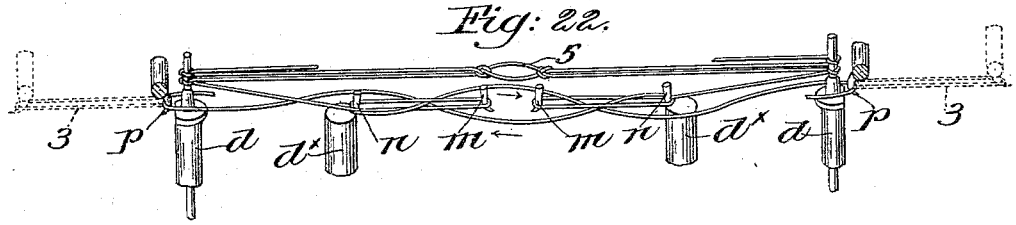
Fig: 22.
Witnesses:
A. C. Harmon
Thomas J. Drummond
Inventors
George W. Harris.
William R. Harris.
by Dosby Gregory, Attys.

(No Model.)  
10 Sheets—Sheet 9.
G. W. & W. R. HARRIS.
MACHINE FOR MAKING LOOM HEDDLES.
No. 603,080. Patented Apr. 26, 1898.
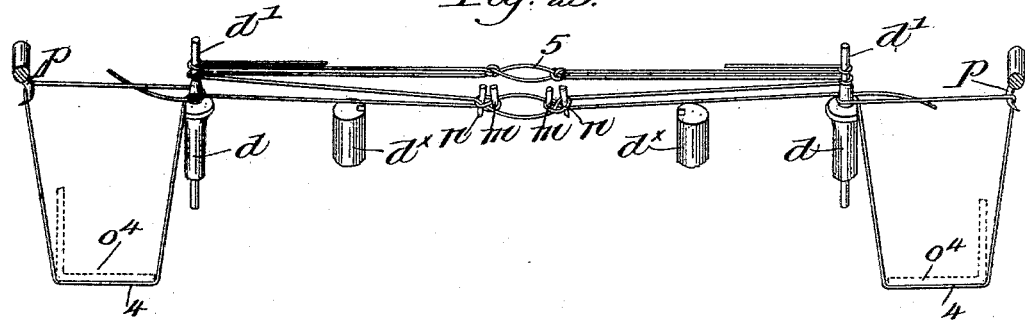
Fig: 23.
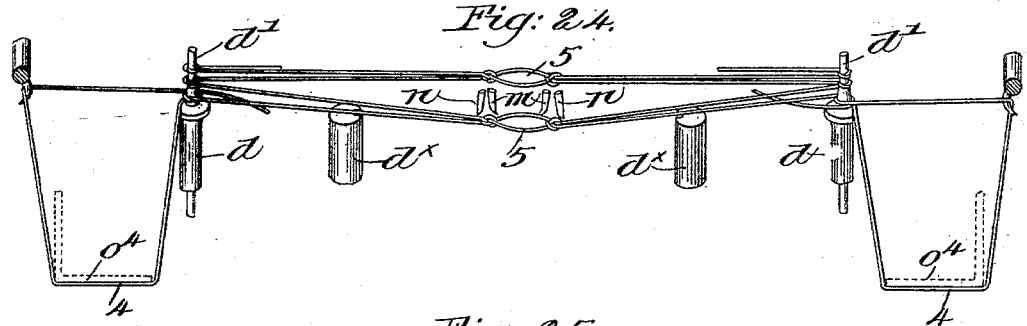
Fig: 24.
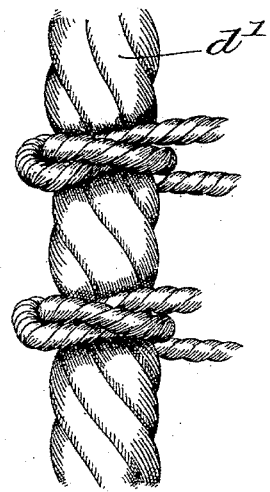
Fig: 25.
Witnesses:
A. C. Harmon
Thomas J. Drummond
Inventors
George W. Harris
William R. Harris
by Crosby Gregory attys.

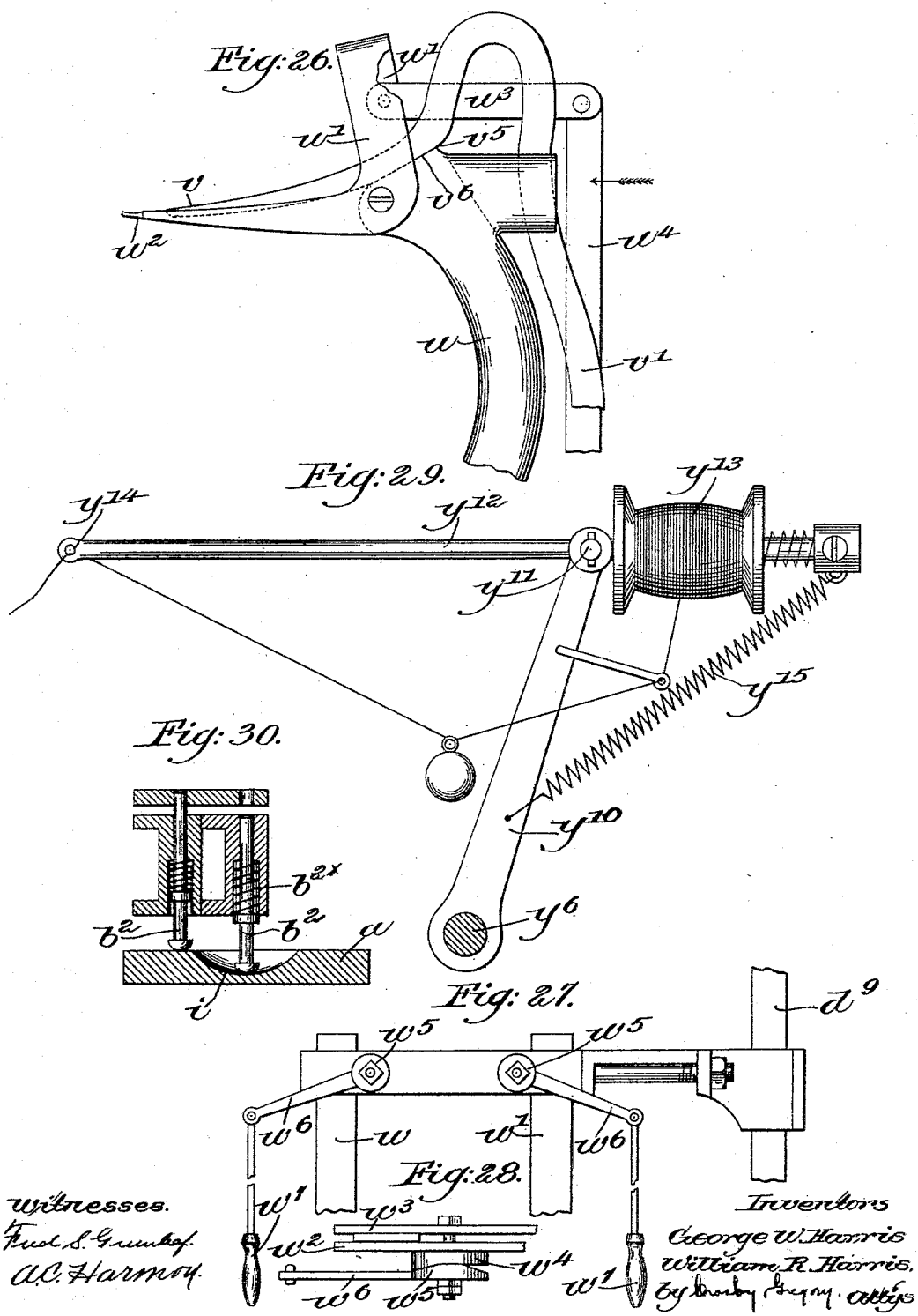

UNITED STATES PATENT OFFICE.

GEORGE W. HARRIS AND WILLIAM R. HARRIS, OF LOWELL, MASSACHUSETTS.

MACHINE FOR MAKING LOOM-HEDDLES.

SPECIFICATION forming part of Letters Patent No. 603,080, dated April 26, 1898.

Application filed April 27, 1895. Serial No. 547,357. (No model.)

*To all whom it may concern:*

Be it known that we, GEORGE W. HARRIS and WILLIAM R. HARRIS, of Lowell, county of Middlesex, State of Massachusetts, have invented an Improvement in Machines for Making Loom-Heddles, of which the following description, in connection with the accompanying drawings, is a specification, like letters on the drawings representing like parts.

This invention relates to machines for manufacturing loom-harnesses from string or twine and of the class typified in United States Reissued Patent No. 5,282, of February 11, 1873, issued to Joseph S. Winsor.

One of the principal objects of this invention is to provide suitable means whereby the heddle-twines may be tied directly about and upon the rig-bands instead of about and upon points surrounding or at the sides of the said rig-bands. To accomplish this object, we have provided a machine in which the rig-bands are held tightly and positively between two points, thereby enabling such a tension to be put upon the said bands as will admit of tying and drawing the band-knots directly about and upon them without drawing the bands together and thereby narrowing the harness. To enable this to be done, our invention also comprehends the use of suitable points about which the band-knots may be formed, but which are so shaped that in tying the knots automatically slip therefrom upon the bands, where they are finally tightened.

In machines of this class the harness strings or twines are carried in the form of cops or upon suitable spools, which are caused to travel in suitable manner to form the proper knots both at the rig-bands and at the ends of the central eyes, these spools or cops being mounted upon what are called "swans," driven from suitable swan-carriers through the medium of two carrier-pins, which must be successively withdrawn from and again inserted in the swans to permit the swans to pass above and their carriers to pass below the depressors which separate the loops through which the spools or cops passed. Heretofore, so far as we are aware, these pins have been automatically depressed by the loop-depressors, throwing much wear upon the latter and also creating considerable friction and rendering it impossible to operate the machine at a high rate of speed. To obviate this difficulty, our invention comprehends the use of one or more cams for imparting desired movements to these carrier-pins, thereby relieving the loop-depressors to that extent.

Our invention also comprehends a novel tokening device.

The above, together with other features of our invention, will be hereinafter fully described in the specification, and specifically pointed out in the claims at the end of the same.

Figure 2:
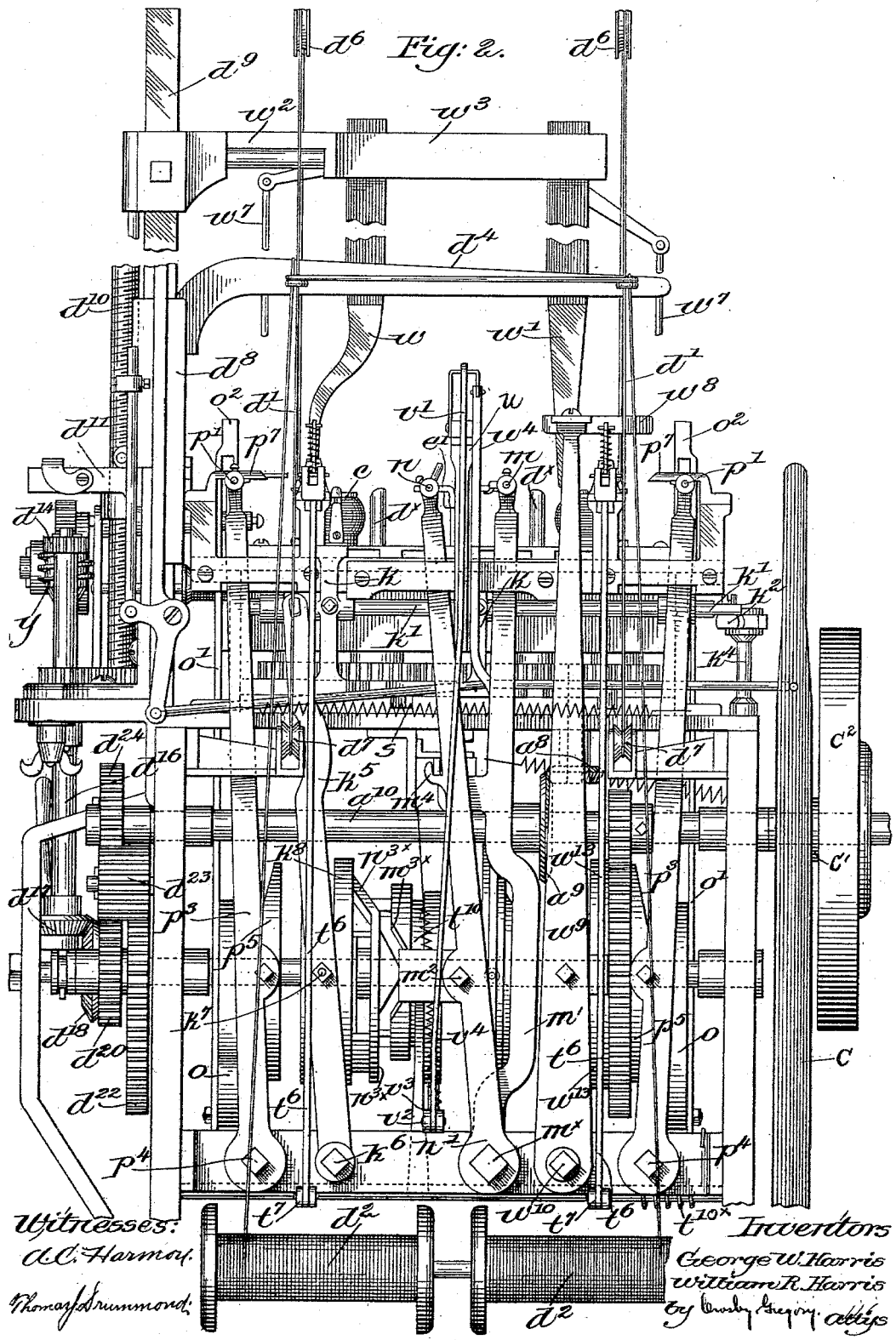
Figure 3:
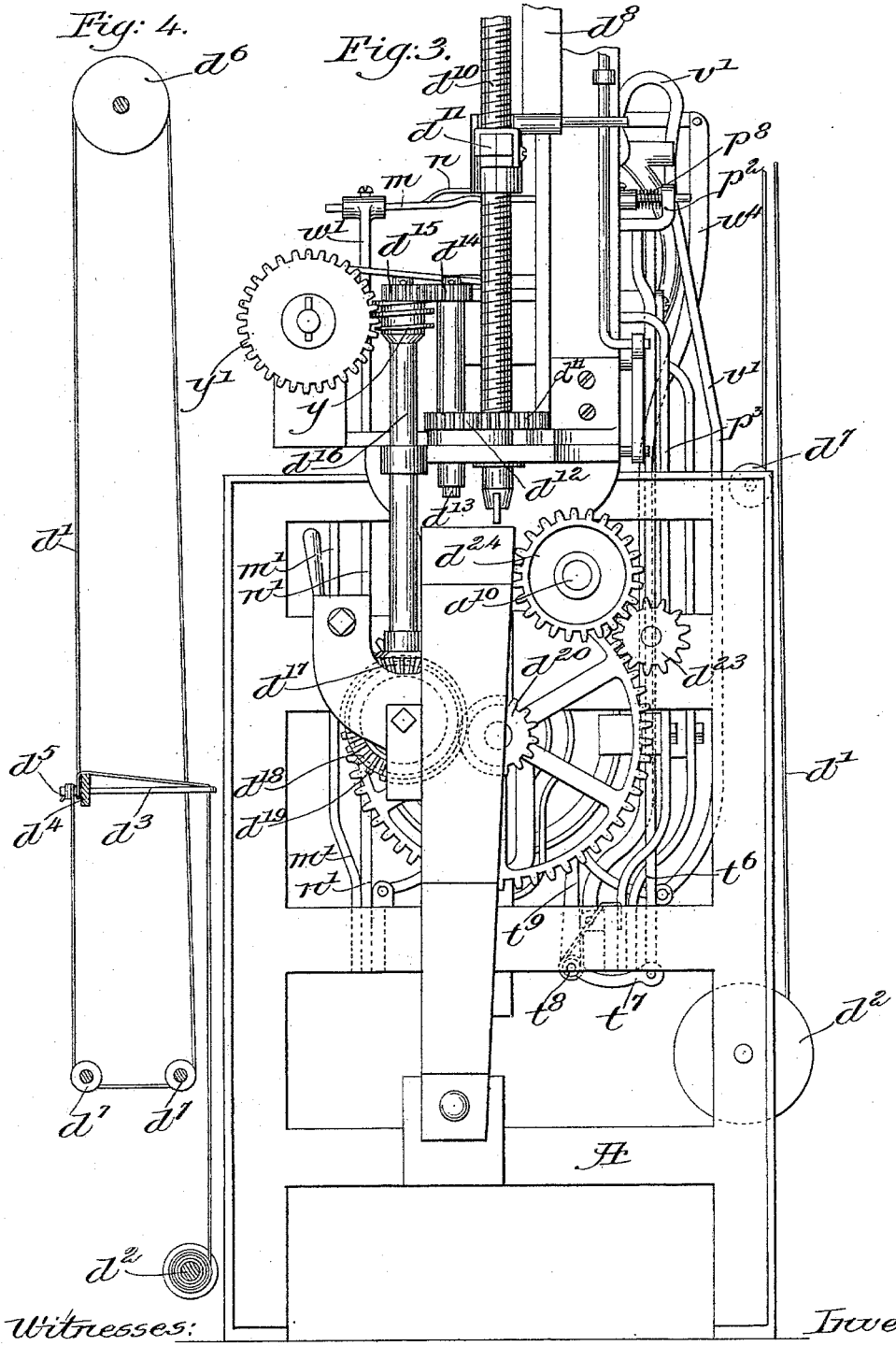
Figure 4:
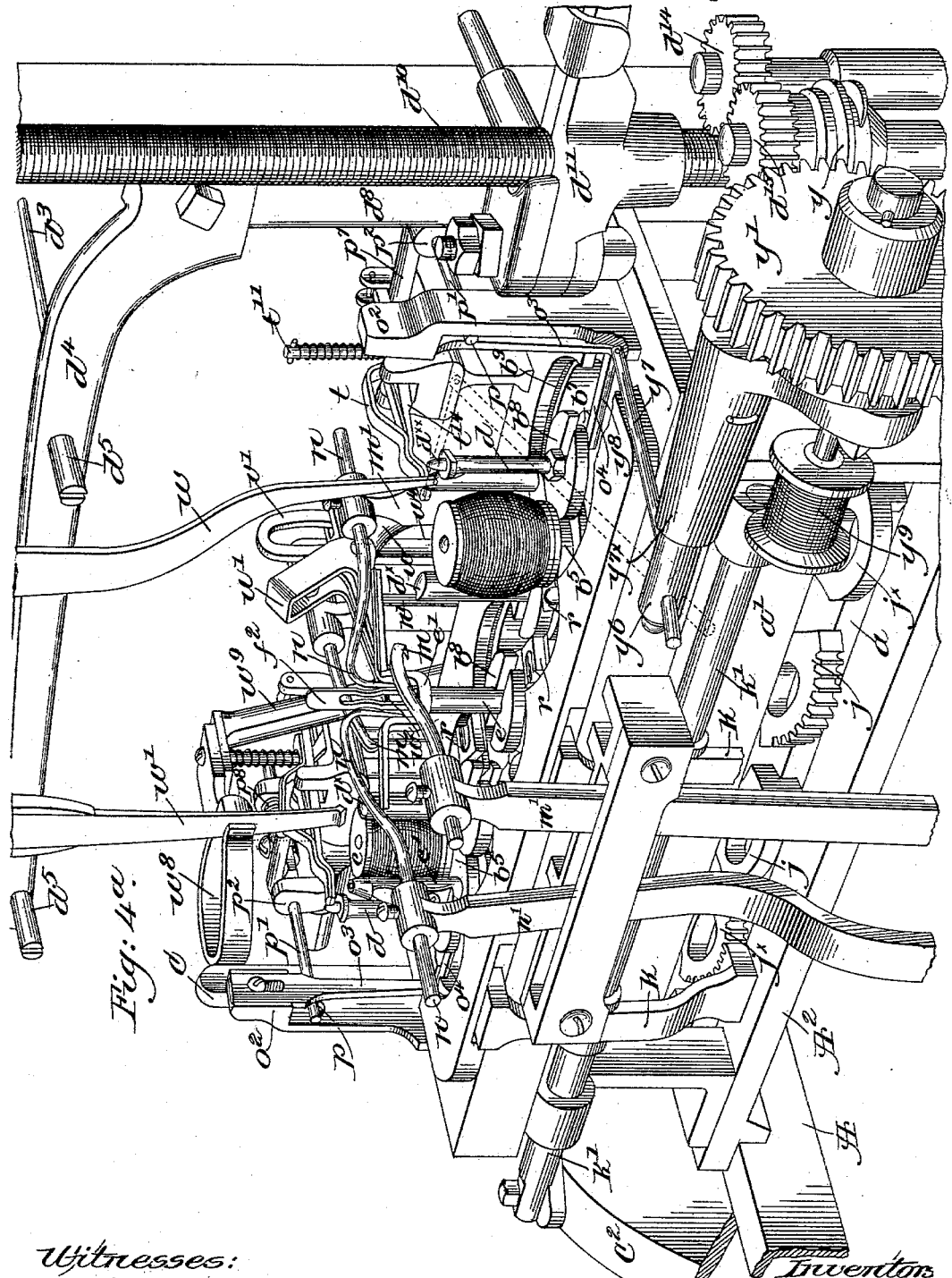
Figure 5:
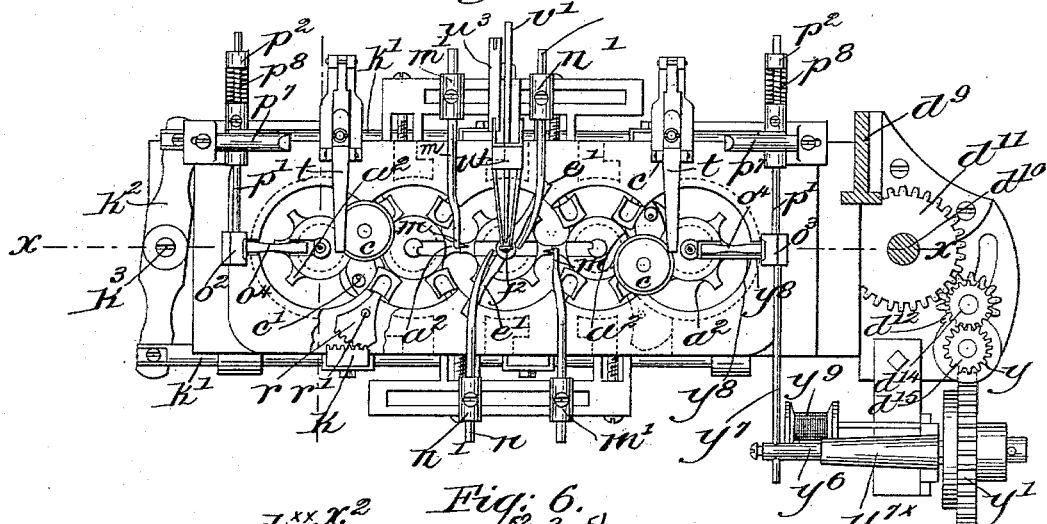
Figures 6, 6A:
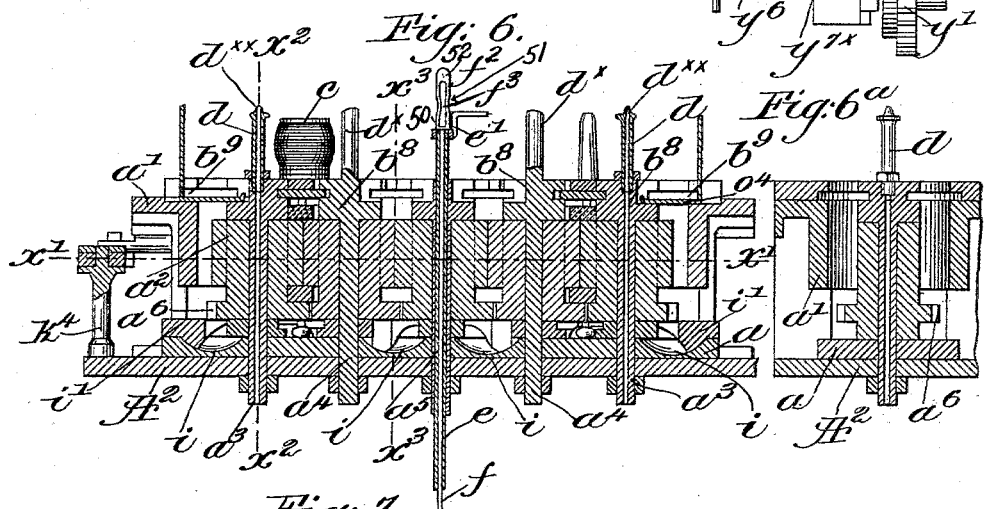
Figures 7, 7A:
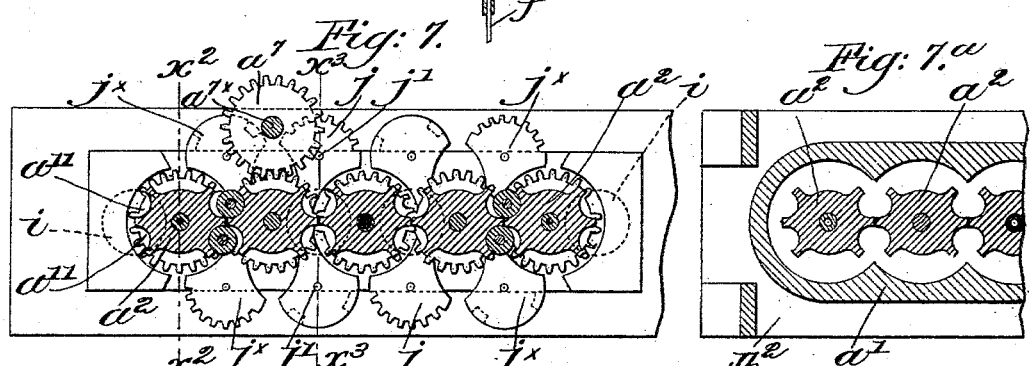

In the drawings, Figure 1 is a front elevation of a machine embodying our invention, a portion of the upper framework being broken away. Fig. 2 is an opposite or rear elevation of the machine Fig. 1, a portion of the frame at the bottom being broken away to expose portions of the upper framework. Fig. 3 is a right-hand end elevation of Fig. 1; Fig. 4, a diagram illustrating the running of the rig-bands; Fig. $4^a$, a perspective view, on an enlarged scale, of the top part of the machine Fig. 1; Fig. 5, a top or plan view of the head of the machine Fig. 1, with the upper framework omitted; Fig. 6, a partial vertical longitudinal section taken on the dotted line $x\ x$, Fig. 5; Fig. $6^a$, a vertical sectional detail on the dotted line $x^2\ x^2$, Fig. 6, looking to the right; Fig. 7, a horizontal section on the dotted line $x'\ x'$, Fig. 6, with the box-like head omitted; Fig. $7^a$, a horizontal sectional detail on the dotted line $x'\ x'$, Fig. 6, showing the cross-sectional formation of the box-like head; Fig. 8, a vertical section on the dotted lines $x^2\ x^2$, Figs. 6 and 7, looking to the left; Fig. 9, a sectional detail taken on the dotted lines $x^3\ x^3$, Figs. 6 and 7, looking to the right, with the swan and its carrier in elevation; Figs. 10 and 11, perspective details showing a swan, its carrier, and the driver therefor; Figs. 12 and 13, details respectively of two of the switches to be described; Fig. 14, an enlarged vertical sectional detail of one form of nippers; Fig. 15, a perspective detail showing one of the rolling-hooks to be described; Figs. 16 to 18, inclusive, detail views of as many different cams, some being shown in connection with their cam-operated respective levers; Figs. 19 to 24, inclusive, diagrams illustrating the method of tying the knots; Fig. 25, a detail of a portion of a rig-band, on an enlarged scale, showing two of the band-knots tied thereupon; Fig. 26, a detail of the depressor and lifter for the heddle-eye; Figs. 27 and 28, clamping devices for holding the lease-rods in position; Fig. 29, a view illustrating a different form of tokening device; Fig. 30, a detail showing a modified construction of the carrier-pins and means for operating the same.

In the embodiment of our invention selected for illustration herein and shown in the drawings, A A are suitable end frames connected at proper points by suitable cross-bars A' and supporting at their upper ends the bed-plate $A^2$.

Referring particularly to Figs. 5 to 7, inclusive, the plate $A^2$ supports what we shall call the "cam-plate" $a$, and the said plate also supports (see Figs. 6 and $6^a$) the box-like head $a'$. This box-like head $a'$ is provided with a longitudinal series of intersecting cylindrical chambers (see Fig. $7^a$) for the reception of the several rotating drivers $a^2$, loosely journaled upon the fixed pivot studs or posts $a^3$, $a^4$, and $a^5$, the two end studs being lettered $a^3$, the middle one $a^5$, and the intermediate studs $a^4$, said studs being suitably supported in the bed-plate $A^2$. (See Fig. 6.) These drivers $a^2$ (see Figs. 6, 7, 8, and 10) are provided at or near their lower ends with suitable gear-wheels $a^6$, which intermesh in order that rotation of one may cause simultaneous rotation of the others, one of the said gears, herein shown as one mounted upon one of the intermediate studs $a^4$, being driven by a gear $a^7$ (see Fig. 7) and fast upon a suitable vertical shaft $a^{7\times}$, provided with a bevel-gear $a^8$ in mesh with a bevel-gear $a^9$, fast on the horizontal main shaft $a^{10}$ of the machine and journaled in suitable bearings in the end frames A. Rotation of this main shaft causes rotation of the several gears $a^6$ and their respective drivers in the direction of the arrows, Fig. 7.

Each of the drivers $a^2$ is provided (see Fig. 7) at each of its opposite sides with two adjacent vertical grooves $a^{11}$ for the reception of the vertical cylindrical members $b$ $b$ of the swan-carriers, (see Figs. 10 and 11,) the said vertical members $b$ $b$ being connected at top and bottom by suitable shuttle-like heads $b'$, as shown. Each of these vertical members $b$ of the swan-carrier is provided with a central hole for the reception of the carrier-pins $b^2$, said pins (see Fig. 10) being provided at their lower ends with suitable rounded heads $b^3$, which in the normal travel of the swan-carriers by the drivers rest and travel upon the surface of the cam-plate, the said pins at their upper ends projecting vertically above the swan-carrier into suitable holes $b^4$ in the shuttle-like swans $b^5$. These swans $b^5$ are provided at their sides with guiding-ribs $b^6$, which at one side the swans enter suitable guiding-grooves $b^7$ in the bosses $b^8$ upon the pivot-studs of the respective drivers and at their opposite sides in suitable grooves $b^9$ in the top plate of the head, the said guiding grooves and ribs $b^6$ acting to keep the swan in proper alined position during its movements.

The swans, it will be seen, have pointed ends and are concaved at their opposite sides, so that at all times they have at least three bearing-points to keep them in proper alinement, two of their bearing-points being near the ends and at the outer sides of the swans, the third bearing-point being on the under side of the swans and intermediate the length of the latter, all of which may be best understood by reference to Figs. 10 and 11.

The swans $b^5$ are suitably adapted to carry the spools $c$ or it may be cops of twine for the formation of the heddles, and in front of the same we prefer that the said swans should carry a suitable, preferably vertical, thread-guide $c'$.

Referring to Fig. 6, the endmost pivot-studs $a^3$ terminate at their upper ends in the hollow pillars $d$, and through these pillars $d$ are passed the back or rig bands $d'$, (see Figs. 1, 2, and 4,) said rig-bands being drawn from coils or spools $d^2$, journaled in the frame upwardly at the back of the machine, to and through suitable eyes in the wire-frame $d^3$ on the vertically-movable bar $d^4$, to be described, under or about pins $d^5$ on the said bar $d^4$, thence up and over suitable pulleys $d^6$, journaled in the upper framework of the machine, down at the back of the machine to and about the smaller pulleys $d^7$, and thence upwardly through the end posts $a^3$ and pillars $d$ to and again firmly secured to the pins $d^5$. While the rig-bands are drawn from the spools, yet in effect the portions of the rig-bands upon which the heddles are tied are first tied to the pins $d^5$, passed about the pulleys, drawn taut, and again tied to the same pins, forming, in effect, endless bands positively held between two holding devices or points $d^6$ $d^7$, so that they cannot yield, these endless bands being of sufficient length between the points at which they are held to form the desired length of harness.

Referring now to Figs. 2 and 4, the vertically-movable bar $d^4$ is provided at one end with a suitable head $d^8$, fitted to slide upon the vertical standard $d^9$, erected upon the bed-plate of the machine. Standing at the side of the standard $d^9$ is a vertical screw $d^{10}$, which receives a suitable nut $d^{11}$, connected with the head $d^8$, rotation of the screw in suitable manner gradually raising the bar $d^4$ to thereby move the rigidly-held rig-bands slowly upward through the hollow pillars $d$ as the heddles are tied thereupon. The threaded shaft or screw $d^{10}$ is rotated (see Figs. 3 and 5) by means of a gear-wheel $d^{11}$, fast upon its lower end and in mesh with a pinion $d^{12}$, sleeved upon a suitable stud $d^{13}$ and provided at its upper end with a second pinion $d^{14}$, in mesh with and driven by a pinion $d^{15}$ on the upper end of the worm-shaft $d^{16}$, journaled in suitable bearings in the frame and provided at its lower end with a beveled pinion $d^{17}$, driven by a beveled wheel $d^{18}$, loosely mounted upon a suitable stud and having fast to it a spur-wheel $d^{19}$, in mesh with and driven by a pinion $d^{20}$ on the cam-shaft $d^{21}$ below and driven through gears $d^{22}$, $d^{23}$, and $d^{24}$ from the main shaft $a^{10}$.

Within the hollow central pivot post or stud $a^5$ (see Fig. 6) is a vertically-movable hollow shaft $e$, provided at its end with the oppositely-extended middle depressor-arms $e'$, which we shall hereinafter denominate as the "middle" depressor. The hollow shaft $e$ at its lower end (see Fig. 1) passes through the horizontal arms of a bracket $e^2$, depending from the bed-plate, and below said bracket is provided with a radial arm $e^3$, between which and a collar $e^4$, fast on the said shaft $e$, is inserted the arm $e^5$ on the vertically-sliding bar $e^6$, having a roll or other stud (not shown) which enters the cam-groove $e^7$ (see Fig. 17) in a cam disk or wheel $e^8$, fast on the shaft $d^{21}$. Rotation of the shaft $d^{21}$ acts through this cam to raise and lower the slide-bar $e^6$ and impart to the hollow depressor-shaft a corresponding vertical movement to raise and lower the depressor $e'$.

Through a hole in the end of the radial arm $e^3$ (see Fig. 1) is extended a rod $e^9$, projecting from one arm of a fork $e^{10}$, pivoted at $e^{11}$ and having a spring $e^{12}$ acting to turn it into its position, Fig. 1, with its other arm $e^{13}$ acting against a face-cam $e^{14}$, shown as on the face of the cam-wheel $e^8$. During rotation of the cam-shaft as the slide-bar $e^6$ is moved to depress the middle depressor $e'$ the cam $e^{14}$ throws the fork $e^{10}$ to the left, Fig. 1, and through its rod $e^9$ and the radial arm $e^3$ imparts simultaneously a rotative movement to the presser to swing its arms into alinement with the pillars and hooks about which the knots are tied, the said depressor as it is again raised being likewise turned into its angular position (shown in Figs. 4ª and 5) to cast off the loops, as will be hereinafter described.

Within the hollow shaft $e$ (see Figs. 1 and 6) is a vertical rod $f$, which at its lower end is fastened to a collar $f'$, loose on the cam-shaft $d^{21}$, and at its upper end, above the middle depressor $e'$, is provided with a flat head $f^2$, having a central slot $f^3$, which constitutes an eye-former, to be described, said eye-former in the present invention being held stationary—i. e., against vertical movement—by the collar $f'$ as distinguished from movable formers heretofore employed.

Referring now to Figs. 4ª and 5, $m$ $m$ and $n$ $n$ are suitable knot-forming hooks, shown as formed upon the ends of inwardly-projecting arms held adjustably in the free ends of the carrying-levers $m'$ $m'$ and $n'$ $n'$, said levers being pivoted at opposite sides the machine at $m^x$, the two levers $m'$ and $n'$ at the same side of the machine being pivoted upon the same pivot stud or screw.

One of the levers at each side the machine—in the present instance the lever $n'$ at the front of the machine and $m'$ at the back of the machine—is cam-actuated, the lever $n'$ (see Fig. 1) having an arm $n^2$, operated by a suitable face-cam $n^{3\times}$ on the shaft $d^{21}$, and the lever $m'$ at the back of the machine (see Fig. 2) being provided with an arm $m^2$, actuated by a path-cam $m^{3\times}$, also on the said shaft $d^{21}$. The levers $m'$, being diagonally opposite, are connected by a suitable cross-lever $m^3$, (see Fig. 1,) pivoted loosely about the middle depressor-shaft $e$ and having its ends engaging notches $m^4$ (see Fig. 2) in the said levers, so that positive cam-actuated motion of one will be communicated through the lever referred to and to impart a simultaneous opposite motion to the other, movement of either one toward the middle depressor causing a simultaneous movement of the other also toward said depressor, and vice versa, movement of one away from the middle depressor causing a like movement of the other also away from the said depressor. The levers $n'$ are similarly connected by a cross-lever $n^3$, also pivoted upon the shaft $e$, directly below the lever $m^3$, its ends entering suitable notches in the said levers, (not herein shown,) so that positive cam-actuated movement of one of the levers $n'$ causes simultaneous opposite movement of the other, they both moving toward and from the middle depressor together.

Referring now particularly to Figs. 1, 2, 4ª, and 5, upon the shaft $d^{21}$, close to but inside the end frames, are fixed the end-depressor cams $o$ $o$, one of which is shown separately in Fig. 16, the same actuating the vertical slide-bars $o'$, which are extended upwardly through the bed-plate and head of the machine, through suitable guideways therein, and at their upper ends are provided with suitable heads $o^2$, depending from which and separated somewhat from the slide-bars $o'$ are the end depressors $o^3$, (see Fig. 6,) having their lower ends $o^4$ turned squarely in toward the middle of the machine, the said in-turned ends of the depressors reaching nearly or quite to the end pillars $d$. Within the space between the vertical arms of the end depressors $o^3$ and the slide-bars $o'$ (see Figs. 4ª, 5, and 6) are the rolling hooks $p$ on the rotatable shafts $p'$, loosely journaled (see Fig. 15) in the forked ends $p^2$ of the levers $p^3$, (see Fig. 2,) arranged at the back of the machine and pivoted at $p^4$, said levers being provided with roller or other studs acted upon by suitable cams $p^5$ on the cam-shaft $d^{21}$ and shown in Figs. 1 and 2. The cams $p^5$ serve to vibrate the levers $p^3$ to cause the hooks $p$ to move toward and from the end pillars $d$, and in order to impart to the said hooks a rolling motion as well we have provided the hook-shafts $p'$ (see Fig. 15) with suitable cam-lugs $p^6$, which as the ends of the levers are moved away from the end pillars $d$ are engaged by stationary fingers $p^7$, mounted on the head, and which act to roll the said cam-lugs and their hooks away from the said pillars to thereby hold the loops of string, said fingers holding the hooks in their rolled positions during the remainder of the outward or separating movement. As the hooks are moved inwardly toward the end pillars $d$, when the cam-lugs $p^6$ leave the end of the fingers $p^7$ springs $p^8$ act to roll the hooks back again to their original positions to deliver the loops. A single spring $s$ (see Fig. 2) is shown as attached at its ends to the levers $p^3$, acting to draw the same toward each other and holding them in operative contact with the outer faces of their respective cams, and, referring to Fig. 1, springs $s'$ are shown connecting the respective levers $m'$ $n'$ at the front of the machine with the end frames of the latter to keep the said levers and also their connected levers at the opposite side of the machine under proper operative control of their respective cams.

Referring to Fig. 6, the pivot-posts $a^4$ are shown as extended vertically above the level of the head, as at $d^\times$, to constitute intermediate posts $d^\times$, to be described.

Referring now to Figs. 10 and 11, when an end depressor $o^3$ is down, having spread the loop of twine in order that the spool or cop on the swan may be carried through, it is necessary to disengage the carrying or driving pins $b^2$ from the swan in order that the latter may pass over the depressor while its carrier passes beneath the same; but the swan must at all times be driven by the carrier, so it is necessary that two pins be employed in order that one may be dropped and passed under the depressor and again raised into engaging position before the second one is engaged. This has heretofore been accomplished by providing the pins with beveled ends or heads, which as they come in contact with the depressors will be pushed down and under by the latter and after passing suitable springs act to return them into engagement, the pin thus pushed down by the depressor being held down solely by the latter, and therefore traveling in contact with the under face thereof until it springs up at the opposite side, thus creating considerable wear and friction. To obviate this difficulty we have in the present embodiment of our invention provided suitable cams for moving these pins without throwing any work upon the depressors.

Referring to Figs. 6 to 13, inclusive, we have provided the cam-plate $a$ with a series (herein shown as four in number) of semispherical depressions $i$, these depressions being located one outside of each of the end posts $a^3$ and the other two at opposite sides of the middle post $a^5$—i. e., these depressions are located at such points as it is necessary for the carrier-pins $b^2$ to drop in order to clear the depressors. At opposite ends of the cam-plate $a$ we have provided the fixed cam-pieces $i'$ $i'$, (see Figs. 6, 8, and 11,) provided at their inner curved faces with the cam-grooves $i^2$, following approximately the curve of the depressions $i$ in the cam-plate, the curves $i^2$ being adapted to catch the heads $b^3$ of the approaching carrier-pins $b^2$ and force the same down into the depressions $i$, the latter acting at opposite sides to again raise the pins.

Referring to Figs. 10 and 11, as the swan-carrier moves around the end of the head the first pin to reach the depression $i$ is forced to the bottom thereof by the groove $i^2$ of the cam-piece $i'$ and thereby drops below and clears the end depressor $o^4$, and before the second pin in similar manner drops into the depression to clear the depressor the first pin rises at the opposite side of the depression into engagement with the swan, the second pin rising in like manner later. The pins are thus successively cammed down and up independent of and to clear the depressor, yet at no time do they loose control of the swan.

While the cam-pieces $i'$ for depressing the pins at the ends of the head may be fixed plates, the cam-pieces to depress the pins to clear the middle depressor cannot be fixed, because the swans and the carriers pass constantly in different directions past the same. To provide for this, we have provided four cam-sectors $j$, one of which is shown separately in Fig. 12 and shown in position, Fig. 7, two at each side of the machine, the same being pivoted at $j'$ and having their pointed ends or apices entering between adjacent drivers and substantially over the depressions $i$ beneath them, said sectors being thickened at their apices, as shown in Figs. 6 and 12, in order that they may extend down into the depressions to a greater or less extent. These cam-sectors are provided at their opposite edges with cam-grooves $j^2$, which (see Fig. 9) catch the heads of the carrier-pins as the latter approach and positively force the same down into depressions to thereby clear the middle depressor $e'$ precisely as the end pressors are cleared, as described. Two of these cam-sectors, one at each side the head, are toothed at their outer peripheries for engagement with the short sliding racks $k$ $k$, depending from slide-bars $k'$, mounted in suitable bearings at opposite sides the head and connected at one end of the machine with the opposite ends of a lever $k^2$, pivoted at $k^3$ to a post $k^4$, standing upon the bed-plate $A^2$. Movement of the lever $k^2$ causes opposite sliding movement of the two rack-bars referred to and shifts the toothed sectors $j$ first into position adjacent the drivers at one of their sides and then into position adjacent the drivers at the opposite sides, the other two sectors shown being automatically shifted by the swan-carriers or their pins as the latter meet the same in their movements. We have also provided four additional sectors, (indicated at $j^\times$,) which enter between the end and intermediate drivers and are similar in construction and operation to the sectors $j$, except that they do not have thickened heads and have no cam-grooves at their edges. Two of these sectors $j^\times$ are toothed to engage and be driven by racks $k$ on the slide-bars $k'$, the other two being loosely and automatically shifted by the swan-carriers in their movements.

At the top of the head we have provided other sectors, which we shall call "guiding-sectors" $r$, (see Figs. 5 and 13,) pivoted at $r'$ and having their ends extended between the carriers in front of them, said guiding-sectors being eight in number, positioned, respectively, over the cam-sectors $j$ and $j^\times$ referred to, four of the same at either side the head being toothed, as is the case with the sectors $j$ and $j^\times$, and in position over the latter, so as to be engaged by like racks, similarly lettered, upon the rack-bars $k'$. The rack-bars $k'$ are simultaneously shifted in opposite directions by means of a shifting lever $k^5$, (see Fig. 2,) pivoted at $k^6$ and actuated at $k^7$ by a suitable face-cam $k^8$ on the cam-shaft.

The cam and guiding sectors, which are automatically moved by the swans or their carriers, act to complete the track or pathway for the swans or their carriers and maintain the same properly in their paths of movement precisely as though they were positively moved, it being necessary to move only those sectors toward the points of which the swans approach, the swans automatically moving all those which they approach from the back—i. e., from the larger ends or heads of the sectors.

Referring to Figs. 5, 14, and 19 to 24, $t\ l$ are two nippers, each of which is shown as comprising two nipper arms or blades $t'\ t^2$, the latter preferably resilient and mounted upon and secured to the former, both being made to slide in a suitable yoke $t^3$, mounted upon a standard $t^4$ on the bed-plate. Between the two blades or arms $t'\ t^2$ of each nipper is a separating-plate $t^5$, supported by the said fixed yoke $t^3$ and in such position that when the two nipper-blades are drawn back it will enter between the two and raise the upper or resilient member from the lower one and hold them separated as long as the two blades are in their rearmost position, return or forward movement of the nipper-blades carrying the same off from the end of the separating-plate $t^5$ and permitting them to spring together to grasp the heddles, as will be described. To move the nipper-blades forward and back, we have provided the levers $t^6$, jointed at their lower ends to arms $t^7$ on the rock-shaft $t^8$, (see Figs. 3 and 18,) the latter being provided with an arm $t^9$, adapted to be acted upon by a suitable cam $t^{10}$ and moved to depress the said lever $t^6$ at the desired intervals. A spring $t^{10\times}$ acts to keep the arm $t^9$ in operative contact with its cam. The levers $t^6$ at their upper ends are each provided with an angular portion $t^{6\times}$, Fig. 14, and above the same are the spindle ends $t^{11}$, which pass through suitable perforations in the lower blades $t'$, springs $t^{12}$ being interposed between the heads of the said spindles and the said nipper-blades. When the levers $t^6$ are depressed by the rock-shaft, the angular portions $t^{6\times}$, acting against the angular faces $t^{13}$ of the yoke $t^3$, are forced to the right to thereby move the nippers also to the right, causing them to be separated, the lower nipper-blades at the same time being dropped by reason of the inclined faces $t^{14}$ dropping off behind the shoulders $t^{14\times}$ at the ends of the yoke. When permitted by the cams, the springs $t^{12}$, surrounding the spindles, together with a spring $t^{10\times}$, surrounding the rock-shaft, will lift the levers $t^6$ to return the nippers again to their positions at the left, they being closed, as described, and the shoulders $t^{14}$ raising them as they are closed, for a purpose to be described.

Referring to Figs. 2, 3, and 26, $u$ is a standard at the back of the machine and substantially in line with the former $f^2$, and to this standard are pivoted the two like bell-crank levers $u'$, having their pointed ends $u^2$ standing just back of the former $f^2$ and slightly above the level at which the knots are tied. Instead of two independent levers a single strip of metal bent into U shape may be and herein is employed. (See Fig. 2.) These bell-crank levers $u'$ are connected by a link $u^3$ with the upper end of a lever $u^4$, pivoted at $u^5$ (see Figs. 3 and 17) and acted upon by a cam $u^6$ on the cam-shaft, which actuates the lever $u^4$ to vibrate vertically the points $u^2$ of the bell-crank lever $u'$.

Arranged between the two points $u^2$ of the bell-crank lever referred to and normally back of the same—i. e., farther from the former $f^2$—is the point $v$ of a lever $v'$, jointed at $v^2$ (see Figs. 2 and 18) to one end of the lever $v^3$, fulcrumed at its opposite end to the frame at the front of the machine and acted upon near its middle by a suitable cam $v^4$ on the cam-shaft, a spring $v^{4\times}$ keeping said lever in operative contact with its cam. Near its upper end the lever $v'$ is crooked, as shown, and provided with a cam-surface $v^5$, which, when the lever is depressed by action of the cam, comes into contact with the inclined surface $v^6$ on the standard $u$, which deflects the point $v$ forward toward the former $f^2$ simultaneously with its downward movement. The lease-rods $w\ w'$ are clamped at their upper ends (see Figs. 27 and 28) between the arm $w^2$ on the standard $d^9$ and a suitable clamping-plate $w^3$. The clamping devices which we prefer to employ are shown in Figs. 27 and 28, wherein the arm $w^2$ is provided with two cam-plates $w^4$, coöperating with which are the cam-disks $w^5$, having arms $w^6$ equipped with pendent handles $w^7$. Bolts extend from the clamping-plate $w^3$ through the two clamping-disks $w^4$ and $w^5$ and are provided with heads or nuts at the front of the latter, so that when the clamping-arms $w^6$ are rotated, causing a relative movement of the cam-disks $w^5$ on the cam-disks $w^4$, the latter are operated, acting through the bolts to clamp the clamping-plates firmly upon and to hold the lease-rods. Pulling movement on the handles $w^7$ releases the cams and permits the lease-rods with the harness thereupon to be removed. One of the lease-rods (herein that lettered $w'$) is acted upon by an arm $w^8$ on the free end of a lever $w^9$, pivoted at $w^{10}$ and acted upon by a suitable cam $w^{13}$, said arm $w^8$, actuated by the cam, acting to vibrate the lease-rod $w'$ from the front to the back of the machine to cause alternate heddles to be formed and laid at the front of the lease-rods and the intermediate heddles at the back thereof for a purpose well known to those familiar with the art.

The operation of the machine is as follows, viz: Referring to Fig. 19, the spools or cops $c$ are moved in the direction of the arrows from their positions there shown in front of and so as to carry the strings around the eye-hooks $n\ n$ and back around the hooks $m\ m$, as in Fig. 20, the said hooks $n\ n$ being at the start, together with the hooks $m\ m$, close up to the intermediate posts $d^\times$, the said hooks $n\ n$, immediately after the string has passed about them, being moved toward each other or the point at which the eye is to be formed, as shown in Fig. 20, to thereby form long narrow loops $l\ l$. The loops $l\ l$ having been formed, the middle depressor $e$ is moved from its position Figs. 4$^\text{a}$ and 5 first into line with the posts $d^\times$ over one of the strands 2 2 of the loops $l\ l$ and then downwardly to depress the said strands, and thus spread and enlarge the loops sufficiently for the passage through them of the spools as the latter are rotated once more around the hooks $m\ m$, as shown in Fig. 21. While the loops $l\ l$ are still spread, as in Fig. 21, the spools continue their movement in opposite directions, as indicated by arrows, and at opposite sides, respectively, of the hooks $n\ n$, each spool being passed through the expanded loop of string taken from the other spool, as represented in dotted lines, Fig. 21, after which the said spools are further moved in opposite directions to and about the pillars $d\ d$ and the rolling side hooks $p\ p$ in their downturned positions outside and close to said pillars or the tapering points $d^{\times\times}$ thereon, as shown in Fig. 22, the middle depressor $e$ at the same time rising to its elevated position to give up the spread loops to permit the same to be contracted or narrowed, as in Fig. 22. The side hooks $p$, immediately after receiving the strings from the spools, are moved bodily away from each other and from the pillars $d$, as shown by dotted lines, Fig. 22, to form loops 3, (see Fig. 20,) the hooks $m\ m$ during this time being moved toward and close up to the hooks $n\ n$ to contract the eye-loops $l$, as in Fig. 23, the hooks $m$ giving up sufficient string to enable said side loops $p$ to be extended in the form of loops 3. The end depressors $o^4$ are now moved to depress the strands 4, forming one-half or part of each loop 3, to thus spread said loops, as in Fig. 23, to enable the spools, which in the meantime have been passed around inside the pillars $d$, to be again passed outside of the said pillars, this time through the spread-loops 3, as shown in Fig. 23, the strings carried by the spools being thus laid in the form of knots about the tapering points $d^{\times\times}$, said knots being afterward tied or tightened upon the ring-bands, as will be described. From the positions Fig. 23 the spools are moved again toward the middle and between the pillars $d\ d$ and the posts $d^\times\ d^\times$, as shown in Fig. 24, to their positions Fig. 19, the eye 5, formed about the hooks $n$ and $m$, Fig. 23, being acted upon and depressed or knocked off said hooks, as in Fig. 24, by the depressor $v$, its end working in the slot $f^3$ in the former $f^2$ to thereby enable the said hooks $n$ and $m$ to be again returned to their positions Fig. 19, the eye thus depressed being pushed upon the enlarged lower end 50 of the former, which serves to partially expand the eye and tighten its knots. As soon as the depressor $v$ has depressed the fully-formed eye upon the former, as described, the knock-off arms $u^2$ descend to a level below the depressor, and immediately the latter is raised and drawn back to release the eye and permit the same under the normal tension of the strings to rise slightly to the smaller diameter 51 of the former, the knock-off points $u^2$ being then moved to catch the eye at its under side and positively raise it upon the enlarged upper end 52 of the former to thereby further expand it and permanently tighten its knots, the knock-off raising the eye to a level above that at which the next succeeding eye is formed. The end spreaders now rise to their positions Fig. 20, thus permitting the loops 3 to be narrowed or contracted, immediately after which, as the spools are moved toward their positions Figs. 21 and 22 to form another eye, the said end hooks $p$ are moved inwardly or toward each other and are rolled, as in Fig. 21, to cast off their respective loops and permit the strings to be drawn in knot form by the moving spools about the tapering points $d^{\times\times}$. In drawing and thereby tightening these loosely-formed loops they are at once slid bodily up and off the ends of the tapering points $d^{\times\times}$ upon the rig-bands, as in Fig. 21, about which the said loops are tightly tied and set and embedded in the rig-bands, as shown in Fig. 25, by the continued strain on the string between the rig-bands and spools. As soon as the parts reach their positions Fig. 19 the strands 6 of the heddle last formed are grasped by the nippers $t\ t$ and raised, as in Figs. 19 and 20, out of the way of the spools below. These nippers stop and hold the strands in their elevated positions above the tops of the points $d^{\times\times}$, such location of the nippers assisting the discharge of the knot-shaped loops from the said points $d^{\times\times}$ upon the rig-bands, Figs. 21 and 22, as stated, preparatory to tightening and setting the same upon the bands. The nippers immediately after the discharge of the string from the points $d^{\times\times}$ are moved to release the strands 6 preparatory to grasping other strands of the heddle next to be formed.

So far as known to us we are the first to slide the rig-band knots off from the points about which they are formed upon the bands before they are tightened and then tighten them directly upon the bands instead of upon the points, as heretofore, and in order to do this the nippers must be located in substantially a line with the tops or, preferably, slightly above the tops of the points. The knots could not well be directly tightened upon the rig-bands were the latter simply drawn frictionally off from the spools containing the same, for the tension at the spools would not ordinarily be sufficient to hold them from unwinding under the pulling strain of the cops in tightening the knots, so it is desirable when tightening the knots directly upon the bands, as herein described, that the latter be held under a sufficiently rigid tension, preferably by holding-points on the rig-bands, which move in unison, to thereby hold the points always taut between them with an unvarying tension.

So far as known to us we are the first to tighten the eye-knots by expanding the eye.

Our improved tokening device may be described as follows, viz: Referring to Figs. 1, 3, and 5, the vertical worm-shaft $d^{16}$ is provided with a worm $y$, which drives the worm-wheel $y'$, and provided at one of its faces with a cam-plate $y^2$, (see Fig. 17$^a$,) provided with two semicircular projections $y^3$ and $y^4$, which coöperate to move a cam projection $y^5$ on a shaft $y^6$, loosely journaled in a suitable bearing $y^{7\times}$, mounted on a bracket standing up from the frame, said shaft $y^6$ carrying at its end the wire $y^7$, having its end turned at right angles at $y^8$ and shown as lying in position on a level with and close beside one of the end depressors $o^4$, said overturned end $y^8$ being hollow in order that the tokening-thread from the spool $y^9$ may be carried through it to the side of the pillar $d$, at the side of which it rises to the rig-band, so that all the heddles formed while this wire $y^7$ is depressed are tied not only about the rig-band, but about this tokening-thread at its side.

A certain number of heddles, usually twenty, having been formed, the cam $y^2$, having a cam projection $y^4$, the cam moving in the direction of the arrow, strikes the cam projection $y^5$ and turns the latter in the direction of the arrow thereon, thereby turning the shaft $y^6$ and the wire $y^7$ into an elevated position (shown by dotted lines, Fig. 4$^a$) above the top of the tapering point $d^{\times\times}$, so that thereafter or while the said wire is elevated the heddles will be tied about the rig-band alone below the tokening-thread. The wire $y^7$ is held in its elevated position until a predetermined number of heddles has been formed, usually twenty, when it is again dropped to a position on a level with the depressor when the latter is in its innermost position to cause the next twenty heddles to be tied about it as well as a rig-band. By means of this device operating as described the tokening-thread, which is usually a colored thread and thereby easily distinguishable from the heddles, is exposed along the rig-bands for twenty heddles, then disappears for twenty, and is again exposed for twenty, and so on throughout the length of the harness.

While we have herein described the tokening-thread as disappearing at every twentieth heddle, yet it is evident that it may be exposed or concealed for any other desired number of heddles.

So far as known to us we are the first to devise means to tie the heddles about the rig-bands and the tokening-thread as well and to leave the tokening-thread exposed or concealed for any desired number of heddles.

We are aware that a tokening-thread has been run alongside the rig-band first at one side the latter and then at the other, but always exposed at one or the other side and caught at intervals to the heddles or the rig-bands; but a tokening-thread so run into the harness is not included within the knot by which the heddle is tied to the rig-bands.

For a modified form of tokening device reference may be had to Fig. 29, wherein the shaft $y^6$, Fig. 4$^a$, carries the arm $y^{10}$, to the outer end of which is pivoted at $y^{11}$ an arm $y^{12}$, which carries at one side its pivot a spool $y^{13}$ of the tokening-thread, its end at the opposite side of said pivot having an eye $y^{14}$, which constitutes a thread-guide, a spring $y^{15}$ connecting the said arm $y^{12}$ with the arm $y^{10}$. In this device when the shaft $y^6$ is turned the thread-guide $y^{14}$ is moved into a position directly back of the end depressor, so that the tokening-thread is stretched from the rig-band beneath the depressor to the thread-guide $y^{14}$, enabling the depressor as it moves downward to depress not only one strand of the twine-loop, but also the tokening-thread as well, the tokening-thread rising again with the depressor at each movement, this being continued for the desired number of heddles, the tokening-thread being tied within the knot at the side of the rig-band, as in the first construction described.

When it is desired that the tokening-thread should be exposed at the outside of the heddles, the shaft $y^6$ is turned by its cam to throw the thread-guide $y^{14}$ into position at one side of the depressor, so that the latter as it descends will catch only the strand of the heddle-string and not the tokening-thread.

Rotation of the main shaft is controlled manually by a suitable shipper-lever C and clutch C' in connection with a usual driving-pulley C$^2$, or said parts may be automatically operated in usual or well-known manner, if desired.

In Fig. 30 we have shown a construction wherein the carrying-pins $b^2$ are pressed downwardly by springs $b^{24}$, the cams being employed simply to raise the pins against the spring action.

Referring to Figs. 10 and 11, it will be noticed that the swans $b^5$ are pointed at their opposite ends and are also concaved at their opposite sides and at their middles, so that during their travel through the irregular paths provided for them they are always supported and steadied at three points—viz., at the concaved middle portion at one side by the driver $b^8$ and at their sides near or at their tapering ends by the curved guiding-wall of the box-like head. By thus holding the swans between the three points, two at the outside and one at the in, proper movement of the same through the paths provided is insured, and the swans are prevented from deviating to the right or to the left, as is the case with the shuttle-shaped swans now employed and which have their widest parts at the middle, tapering therefrom to the points.

It will be noticed, referring to Figs. 1 and 2, that the point-carrying levers $m'$ $n'$ are pivoted on their respective sides of the machine to the right of the vertical center line of the machine, so that in their movement to expand and give up the loops previously cast about them they are at the same time given an upward movement in the arc of a circle about the pivot-points of the levers to cause them to be more or less lifted out of the loops, making it easier to disengage the hooks or points from the said loops than would be the case were the points to have a strictly horizontal movement.

We claim—

1. In a machine for making loom-heddles, the combination with means for holding the rig-bands, of knot forming and tightening devices arranged and operated to form the heddle-knots about and tighten the same directly upon the rig-bands, substantially as described.

2. In a machine for making loom-heddles, the combination with rig-band-holding devices between which the rig-bands are tightly held, and means for moving the said holding devices in unison, whereby the bands are held always under substantially the same tension, of knot forming and tightening devices arranged and operated to form the heddle-knots about and tighten the same directly upon the said rig-bands, substantially as described.

3. In a machine for making loom-heddles, the combination with means for holding the rig-bands, and the points about which and said bands the heddle-knots are formed, of the knot forming and tightening devices arranged and operated to form the knots about said points and bands, and thereafter slip said formed knots onto and tighten the same directly upon said bands above said points, substantially as described.

4. In a machine for making loom-heddles, the combination with means for holding the rig-bands, and the points about which and said bands the knots are formed, of the knot-tying devices, and the nippers arranged on a level with or slightly above the tops of said points, whereby tightening of the knots causes the latter to be slid up from the points upon and to be tightened directly on the said bands, substantially as described.

5. In a machine for making loom-heddles, the combination with means for holding the rig-bands and tokening-thread mechanism for arranging a tokening-thread adjacent to a rig-band, of mechanism for tying the heddles around the rig-band and the tokening-thread.

6. In a machine for making loom-heddles, the combination with means for holding the rig-bands and tokening-thread mechanism for arranging a tokening-thread adjacent to a rig-band as desired, of mechanism for tying some of the heddles around the rig-band and tokening-thread, and other of the heddles around the rig-band alone.

7. In a machine for making loom-heddles, the combination with suitable means for holding the rig-bands, knot-forming points, and depressors, of the swans, their carriers, pins connecting the same, and means independent of said depressors to successively depress said pins to clear said depressors, substantially as described.

8. In a machine for making loom-heddles, the combination with suitable means for holding the rig-bands, knot-forming points, and depressors, of the swans, their carriers, pins connecting the same, and means independent of said depressors to successively depress said pins to clear said depressors and thereafter raise said pins, substantially as described.

9. In a machine for making loom-heddles, the combination with suitable means for holding the rig-bands, the knot-forming points, and depressors, of the swans, their carriers, pins connecting the same, and cams to depress and raise the said pins to clear said depressors, substantially as described.

10. In a machine for making loom-heddles, the combination with the rig-band posts, and the end and center depressors, of an eye-former having an enlarged portion, and means to force the heddle-eye upon said enlarged portion to thereby expand said eye and tighten the eye-knots, substantially as described.

11. In a machine for making loom-heddles, the combination with the rig-band posts, and the end and center depressors, of a stationary eye-former having an enlarged portion, and means to force the heddle-eye upon said enlarged portion, and thereby expand said eye and tighten the eye-knots, substantially as described.

12. In a machine for making loom-heddles, the combination with the rig-band posts, and the end and center depressors, of an eye-former having an enlarged portion, and a lifter to raise the heddle-eye upon said enlarged portion to thereby expand the eye and tighten the eye-knot, substantially as described.

13. In a machine of the class described, the combination with an eye-former having an enlarged portion, of knot-tying devices to form an eye about a reduced portion of the said former and partially tighten the eye-knots, and means to subsequently force the said eye upon the enlarged portion of said former to expand the said eye and further tighten the knots, substantially as described.

14. In a machine for making loom-heddles, the combination with the rig-band posts, and the end and center depressors, of an eye-former having a reduced middle portion about which the eye is formed, and means to force the eye first upon the enlarged portion at one side said reduced portion and subsequently upon the enlarged portion at the opposite side thereof, substantially as described.

15. In a machine for making loom-heddles, the combination with the rig-band posts, knot-forming points, and depressors, of means to expand the completed eye to tighten the eye-knots for the purpose described.

16. In a machine for making loom-heddles, the combination with the rig-band posts, knot-forming points, and depressors, of the swans, their carriers, and movable switches for both the swans and their carriers, and means to positively shift the said switches, substantially as described.

17. In a machine for making loom-heddles, the combination with the rig-band posts, knot-forming points, and depressors, of the swans, their carriers, movable switches for both the swans and their carriers, and means to move some of the said switches, the remainder to be automatically moved by the swans and their carriers, substantially as described.

18. In a machine for making loom-heddles, the combination with the rig-band posts, the knot-forming points, and depressors, of the swans, their carriers, connecting-pins therefor, and movable switches having cam-surfaces to cause positive movement of said pins, substantially as described.

19. In a machine for making loom-heddles, the combination with the rig-band posts, the knot-forming points, and depressors, of the swans, their carriers, connecting-pins therefor, the movable switch-segments, and racks to shift the same, substantially as described.

20. In a machine for making loom-heddles, the combination with the rig-band posts, knot-forming points, and depressors, of the swan-carriers, switches therefor, and pointed swans having concaved sides to provide at least three bearing-points to hold the swans in position, substantially as described.

21. In a machine for making loom-heddles, the combination with suitable means for holding the rig-bands, and the depressors, of the swans, their carriers, devices connecting the said swans and their carriers, and cams for raising the said devices after passing said depressors, substantially as described.

22. In a machine for making loom-heddles, the combination with the swans, and carriers therefor, of the swan-carrying spools or bobbins, and the string-delivering guides in front and to deliver the string in advance of the said spools or bobbins, substantially as described.

23. In a machine for making loom-heddles, the combination with the rig-band posts, knot-forming points, and depressors, of the swans, and carriers therefor, connecting-pins, the string-carrying spools located back of the swan-centers, and string-delivering guides arranged forward of the same and in advance of said spools, substantially as described.

24. In a machine for making loom-heddles, the combination with suitable means for holding the rig-bands, and the depressors, of the swans, their carriers, devices connecting the said swans and carriers, cams to raise the said devices after clearing said depressors, and a supporting-plate to act upon and positively hold the said devices in their elevated positions connecting the swans and their carriers during movements of the same between the depressors, substantially as described.

25. In a machine for making loom-heddles, the combination with suitable means for holding the rig-bands, and the depressors, of the swans, their carriers, devices connecting the same, springs to depress said devices, and means independent of said depressors and springs to raise the same after clearing the said depressors, substantially as described.

In testimony whereof we have signed our names to this specification in the presence of two subscribing witnesses.

GEORGE W. HARRIS.
WILLIAM R. HARRIS.

Witnesses:
JOHN J. PICKMAN,
MILO G. ROBBINS.